(12) United States Patent
Ito et al.

(10) Patent No.: US 7,102,270 B2
(45) Date of Patent: Sep. 5, 2006

(54) DRIVING DEVICE, IMAGE CAPTURE APPARATUS AND MOBILE PHONE

(75) Inventors: Yoshihiro Ito, Saitama (JP); Yoji Naka, Saitama (JP); Takehiko Senba, Saitama (JP); Haruo Onozuka, Saitama (JP); Yukio Noguchi, Saitama (JP)

(73) Assignees: Fuji Photo Film Co., Ltd., Kanagawa (JP); Fujinon Corporation, Saitama (JP)

( * ) Notice: Subject to any disclaimer, the term of this patent is extended or adjusted under 35 U.S.C. 154(b) by 0 days.

(21) Appl. No.: 11/230,668

(22) Filed: Sep. 21, 2005

(65) Prior Publication Data

US 2006/0061233 A1  Mar. 23, 2006

(30) Foreign Application Priority Data

Sep. 21, 2004  (JP)  ............................ 2004-274123
Feb. 25, 2005  (JP)  ............................ 2005-050142

(51) Int. Cl.
  *H02N 2/02*  (2006.01)
  *G03B 29/00*  (2006.01)
(52) U.S. Cl. ................. 310/317; 310/323.17; 310/328; 348/552
(58) Field of Classification Search ................ 310/317, 310/328, 323.17; 348/552
  See application file for complete search history.

(56) References Cited

U.S. PATENT DOCUMENTS

| 5,134,334 | A | 7/1992 | Onishi et al. | |
| 5,225,941 | A | 7/1993 | Saito et al. | |
| 5,589,723 | A | 12/1996 | Yoshida et al. | |
| 5,726,521 | A | 3/1998 | Kon et al. | |
| 6,215,605 | B1 * | 4/2001 | Kuwana et al. | 359/824 |
| 2006/0061234 | A1 * | 3/2006 | Ito et al. | 310/317 |

* cited by examiner

*Primary Examiner*—David M. Gray
*Assistant Examiner*—Derek Rosenau
(74) *Attorney, Agent, or Firm*—Sughrue Mion, PLLC

(57) ABSTRACT

A first drive shaft is disposed with a first piezoelectric element at one end and a second piezoelectric element at the other end. A second drive shaft is disposed with the second piezoelectric element at one end and a third piezoelectric element at the other end. First and second lens holding frames are frictionally engaged with the first and second drive shafts respectively in a slidable manner. The first, second and third piezoelectric elements are expanded and contracted according to a drive signal and move the first and second lens holding frames in an axial direction respectively. When the moving velocity of the first and second lens holding frames are reduced, the phase difference between the drive signals, which are output to the respective piezoelectric elements, is adjusted so that the moving velocity becomes higher.

17 Claims, 11 Drawing Sheets

DRIVING DEVICE, IMAGE CAPTURE APPARATUS AND MOBILE PHONE

BACKGROUND OF THE INVENTION

1. Field of the Invention

The present invention relates to a driving device in which a driven member is frictionally engaged with a drive shaft and moved according to displacements of the drive shaft caused by expansion and contraction of a piezoelectric element, an image capture apparatus and a mobile phone having the driving device.

2. Description Related to the Prior Art

A piezoelectric actuator, which utilizes displacements of a piezoelectric element by applying a voltage, is known. There is a piezoelectric actuator which moves a driven member in a predetermined reference-axis direction by allowing the piezoelectric element to displace at high speed and low speed alternately. Such piezoelectric actuator is applied to driving devices of precision instruments and the like, for instance, a lens driving device of a camera (see U.S. Pat. Nos. 5,225,941 and 5,589,723).

The piezoelectric actuator disclosed in the above references includes a drive shaft and the piezoelectric element fixed to one end of the drive shaft. A lens holding member, which holds a lens, is frictionally engaged with the drive shaft. When the piezoelectric element is displaced at the high speed, a dynamic friction between the drive shaft and the lens holding member is low so that the lens holding member slips along the drive shaft, and stays at the same position by inertia. When the piezoelectric element is displaced at the low speed, a static friction between the drive shaft and the lens holding member is high so that the lens holding member moves in the axial direction according to the displacement of the drive shaft.

The lens holding member is moved toward the piezoelectric element when the piezoelectric element is expanded at the high speed and contracted at the low speed. On the contrary, the lens holding member moves away from the piezoelectric element when the piezoelectric element is contracted at the high speed and expanded at the low speed. A drive signal applied to the piezoelectric element is a triangular pulse of a saw-tooth shape which has a period in which the positive or negative voltage rises quickly and a period in which negative or positive voltage rises slowly. For instance, when the positive voltage is applied to the piezoelectric element during the period, in which the voltage rises quickly, the piezoelectric element is expanded at the high speed. When the negative voltage is applied to the piezoelectric element during the period, in which the voltage rises quickly, the piezoelectric element is contracted at the high speed.

However, in the piezoelectric actuator of the above references, the piezoelectric element is disposed at only one end of the drive shaft. When a distance between the lens holding member and the piezoelectric element is increased, the displacements of the piezoelectric element cannot be transmitted efficiently. As a result, a moving distance of the lens holding member is reduced. Further, since only one drive shaft is provided, plural lens holding members, which are to be moved in different directions, cannot be disposed.

SUMMARY OF THE INVENTION

A main object of the present invention is to provide a driving device which moves two driven members individually and efficiently, and an image capture apparatus and a mobile phone using the driving device.

Another object of the present invention is to provide a driving device, which is capable of adjusting a moving velocity of each of the driven members, and an image capture apparatus and a mobile phone using the driving device.

In order to achieve the above and other object of the present invention, a first piezoelectric element is disposed in contact with one end of a first drive shaft, a second piezoelectric element is disposed in contact with the other end of a first drive shaft and one end of a second drive shaft, and a third piezoelectric element is disposed in contact with the other end of the second drive shaft in the driving device. The first and second driven members are frictionally engaged with the first and second drive shafts respectively in a slidable manner. The driving device further includes a drive signal generating circuit which outputs the drive signal for respectively expanding and contracting the first, second and third piezoelectric elements in an axial direction of the first and second drive shafts to displace the first and second drive shafts in the axial direction so that the first and second driven members are moved in the axial direction.

The driving device further includes a position detector for detecting each position of the first and second driven members and a velocity calculator for calculating each moving velocity of the first and second driven members. A phase control circuit adjusts each moving velocity of the first and second driven members by changing a phase difference between the drive signals for the respective piezoelectric elements according to the calculated moving velocity of each of the first and second driven members.

The driving device further includes a switching section which selectively switches between a circuit, which supplies the drive signal output from the drive signal generating circuit to the first and second piezoelectric elements, and a circuit which supplies the drive signal output from the drive signal generating circuit to the second and third piezoelectric elements.

The drive signal generating circuit outputs the drive signals respectively to the two selected piezoelectric elements such that the two selected piezoelectric elements are displaced in the opposite directions. Further, it is possible to output the drive signal to the first and third piezoelectric elements to move the first and second driven members simultaneously in the same direction. Furthermore, it is also possible to output the drive signal to the first, second and third piezoelectric elements to drive the first and second driven members simultaneously in the different directions.

It is preferable that the first and second driven members are first and second lens holding members, each of which holds a lens. Each of the lens holding members can hold a zoom lens. One of the lens holding members can hold a zoom lens and the other lens holding member can hold a focus lens. It is also preferable that one of the first and second driven members is a lens holding member, which holds the lens, and the other driven member is the lens holding member which holds a light amount control member for controlling an amount of light passing through the lens.

Further, it is preferable that each of the first and second drive shafts is supported by plural shaft supporting members.

An image capture apparatus of the present invention comprises the above driving device and an image capture unit having a solid-state imaging device.

A mobile phone of the present invention comprises the above image capture apparatus.

Since the two drive shafts are disposed between the piezoelectric elements in the driving device, a distance between each of the piezoelectric elements and the driven member is reduced so that fluctuations in the moving velocity of each driven member are prevented. Further, it becomes possible to extend the length of each drive shaft while preventing the fluctuations in the moving velocity of each of the driven members, so that a moving range of each of the driven members can also be extended. Furthermore, a compact driving device can be achieved at a low cost by linearly disposing two drive shafts and using three piezoelectric elements to drive two driven members.

When the moving velocity of the driven member is reduced at a center portion of the drive shaft compared to the end portions, at which the piezoelectric elements are disposed, the moving velocity of the driven member becomes higher by canceling the synchronization of the drive signals and shifting the phase of the drive signal.

Since the drive signal is output to the piezoelectric elements disposed at the both ends of one drive shaft at a time so as to individually drive the two driven members, the two driven members can be moved in the different directions.

When the drive signal is selectively output to two of the three piezoelectric elements, the displacements caused by the expansion and contraction of the piezoelectric elements are in the opposite directions. Accordingly, a stroke of the drive shaft moved by one pulse of the drive signal, is at the maximum. As a result, the moving velocity of each of the driven members is increased.

When the first and the second driven members are simultaneously driven with the same moving amounts, the power consumption can be reduced by reducing the moving time.

When the drive signal is output to each of the three piezoelectric elements to drive the first and second driven members simultaneously, the moving amount of each of the driven members is reduced. Accordingly, it becomes possible to stop each of the driven members at a precise position in a short time after each driven member is moved close to the desired position.

Since the first and second driven members are lens holding members, a compact lens unit, which is suitable for incorporating in the mobile appliances, can be achieved.

When the light amount control member, such as an ND filter, is provided, a compact light amount control member can be achieved by moving the light amount control member to a position where a diameter of the incident light ray becomes minimum.

Since the first and second drive shafts are supported by the plural shaft supporting members so as to prevent the deflections of each drive shaft in a lateral direction perpendicular to the axial direction, the displacements of the piezoelectric elements are efficiently transmitted to each of the first and second driven members.

BRIEF DESCRIPTION OF THE DRAWINGS

The above objects and advantages of the present invention will become easily understood by one of ordinary skill in the art when the following detailed description would be read in connection with the accompanying drawings.

FIGS. 8A, 8B and 8C are explanatory views showing improvements in a moving velocity of the lens holding frame by a phase control of the drive signal.

PREFERRED EMBODIMENTS OF THE INVENTION

Figure 1:
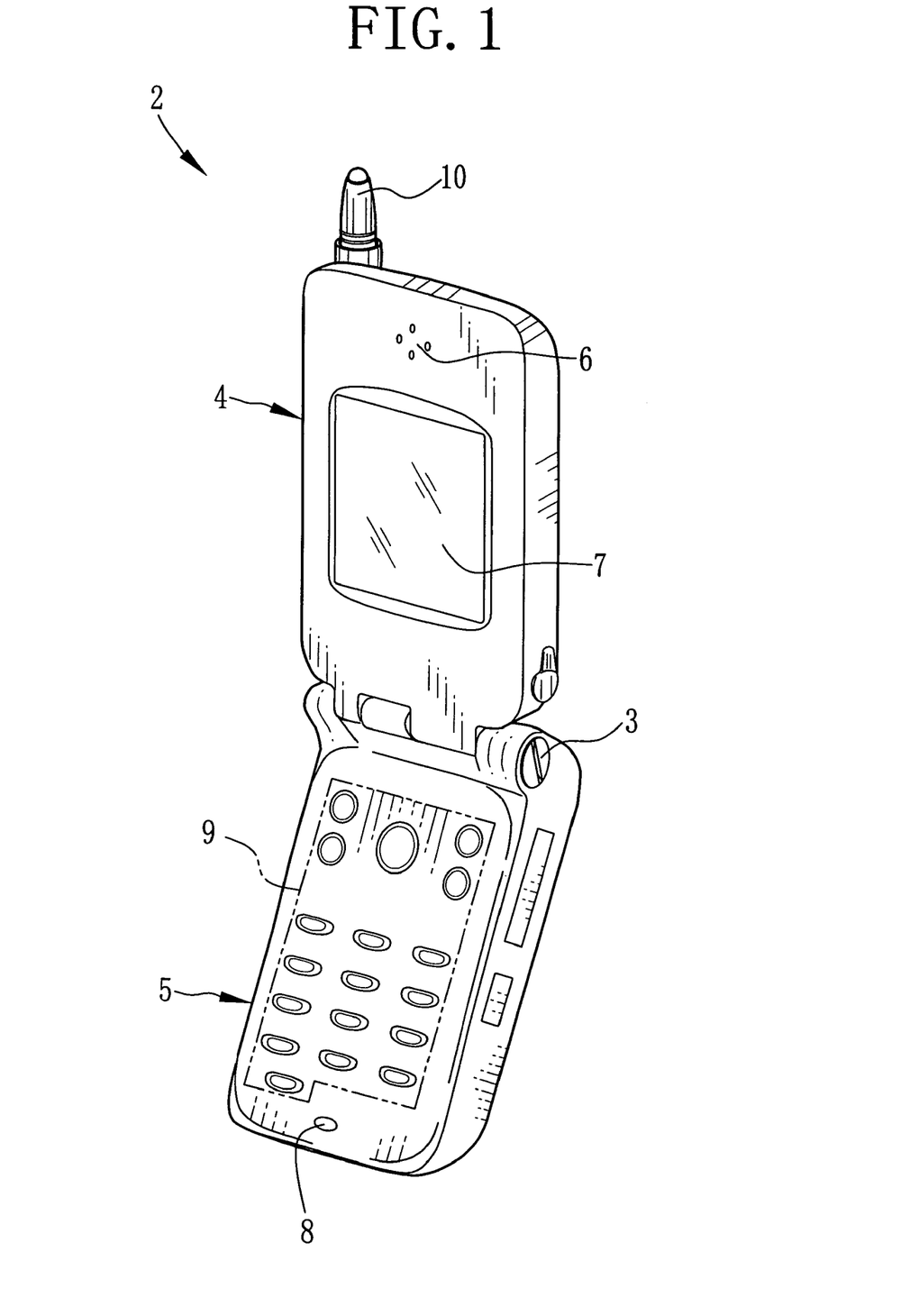
FIG. 1 is an external perspective view of a mobile phone with a camera.

In FIG. 1, a mobile phone 2 with a camera is constructed of a receiver unit 4 and a transmitter unit 5 which are connected by a hinge portion 3 in a foldable manner. On a front of the receiver unit 4, a speaker 6, which outputs a received voice, and a liquid crystal display (LCD) 7 are disposed. The LCD 7 displays various menu screens and images captured by an incorporated camera which will be described later. On a front of the transmitter unit 5, a microphone 8 and an operation inputting section 9 are disposed. The microphone 8 converts a voice, which is to be transmitted, into electrical voice signals. The operation inputting section 9 includes various operation buttons.

Figure 2:
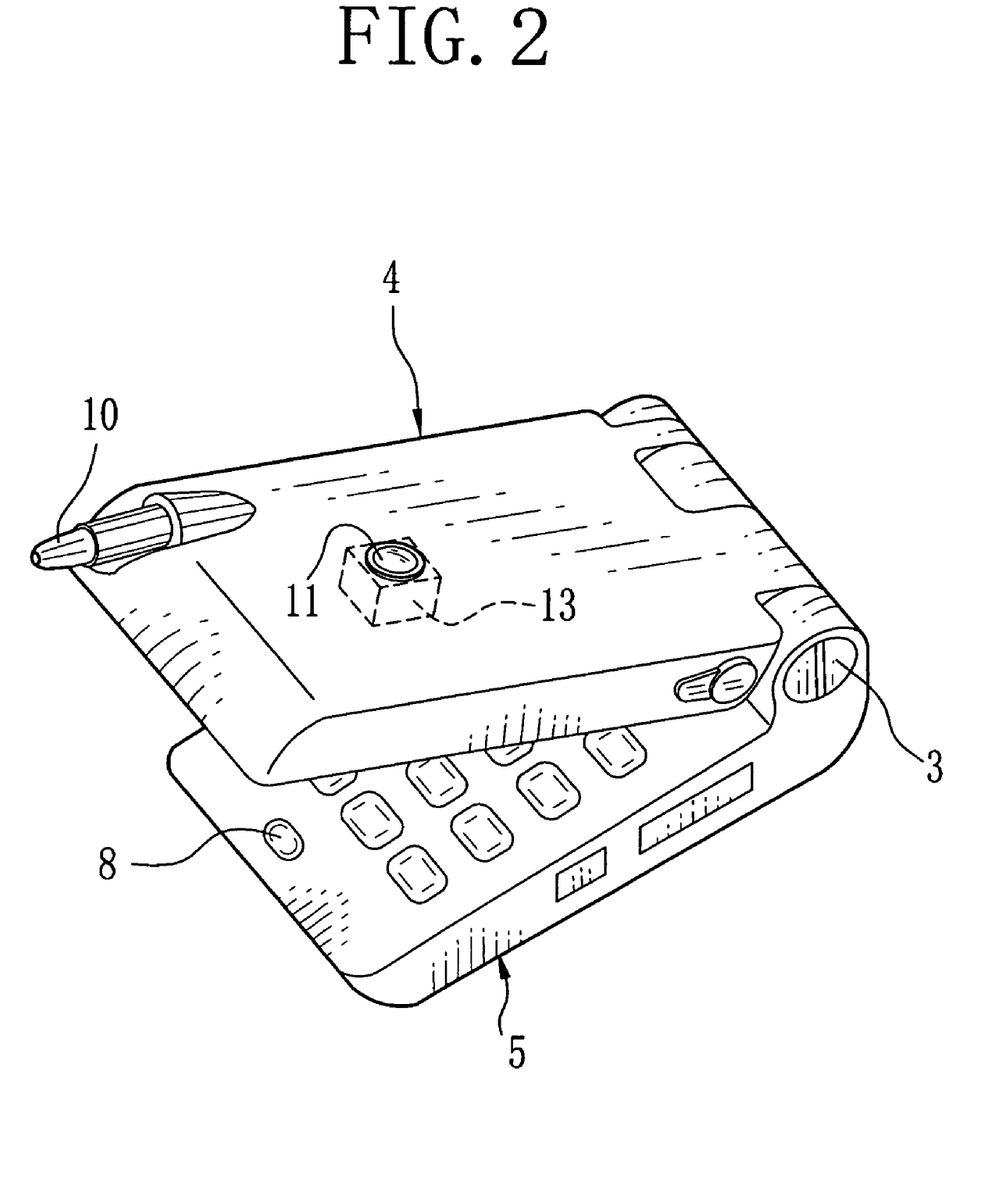
FIG. 2 is a perspective view of the mobile phone with the camera folded in half.

In FIG. 2, on the back of the receiver unit 4, an antenna 10 is disposed for transmitting and receiving radio waves. The antenna 10 is extended when making a telephone call, and accommodated when not in use. Further, on the back of the receiver unit 4, a camera section 13 is disposed. A lens of the camera section 13 is protected by a cover glass 11.

Figure 3:
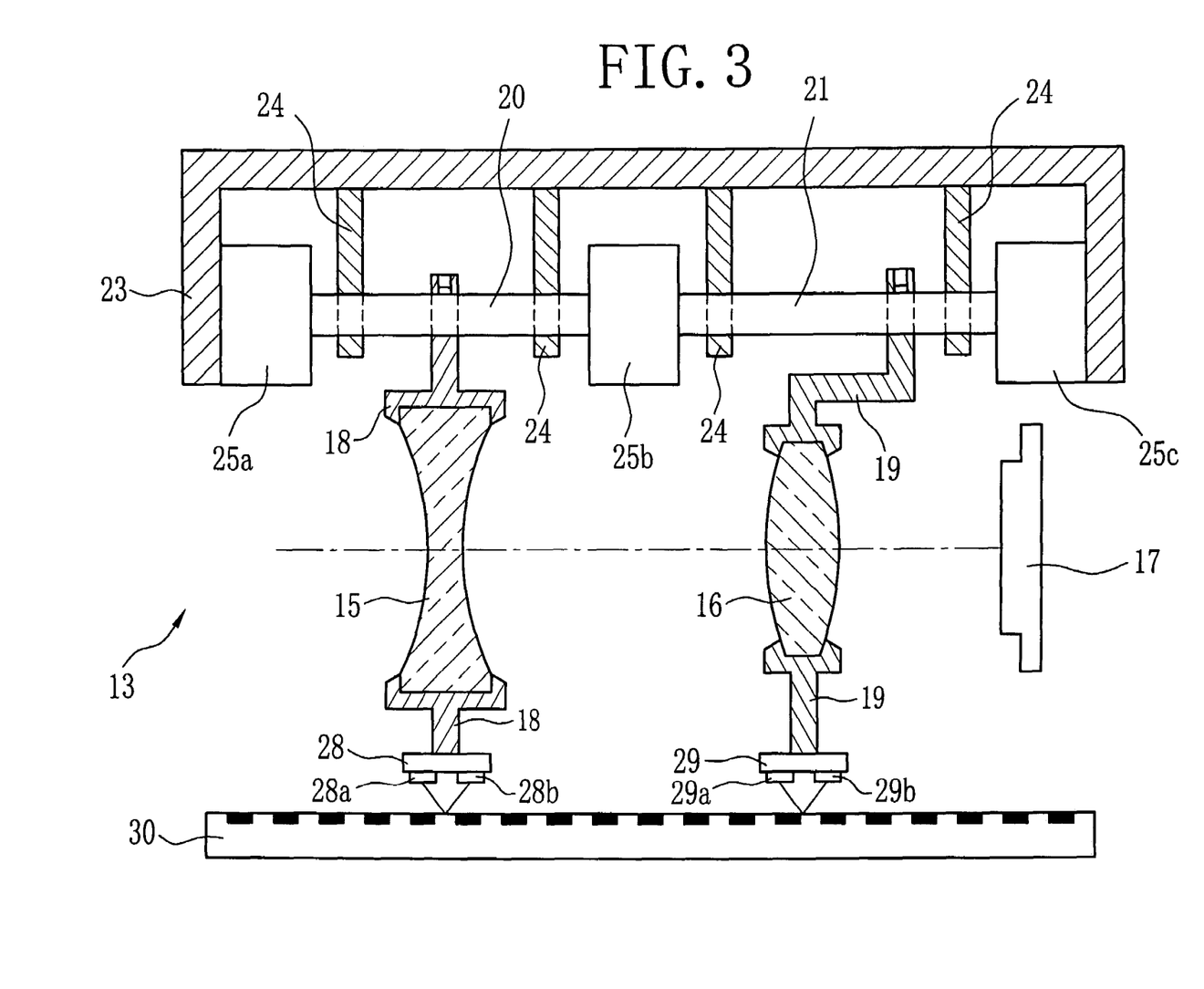
FIG. 3 is a cross-sectional view of a camera section.

In FIG. 3, the camera section 13 is provided with a first lens 15, which is a concave lens disposed on an object side, and a second lens 16 which is a convex lens disposed on an image side. A focal distance is changed by changing an interval between the first lens 15 and second lens 16. Further, the first lens 15 and the second lens 16 are assembled to form a zoom lens, and the focus is adjusted by moving the second lens 16. An image sensor 17 captures a subject image formed by a subject light, which has passed through the first lens 15 and the second lens 16, on a receiving surface. The first lens 15 and the second lens 16 are held by a first lens holding frame 18 and a second lens holding frame 19 respectively. The first lens holding frame 18 and the second lens holding frame 19 are frictionally engaged with a first drive shaft 20 and a second drive shaft 21 respectively.

The first drive shaft 20 is disposed between a first piezoelectric element 25*a* and a second piezoelectric element 25*b*. The second drive shaft 21 is disposed between a second piezoelectric element 25*b* and a third piezoelectric element 25*c*. The first piezoelectric element 25*a* is fixed to a frame member 23 and to one end of the first drive shaft 20. The second piezoelectric element 25b is fixed to the other end of the first drive shaft 20 and to one end of the second drive shaft 21. The third piezoelectric element 25c is fixed to the other end of the second drive shaft 21 and the frame member 23. The first, second and third piezoelectric elements 25a–25c are made of piezoelectric ceramics. The piezoelectric elements 25a–25c distort in different directions with respect to a polarity of each of the piezoelectric elements according to direction of the applied voltage.

The first and second drive shafts 20 and 21 are supported by plural shaft supporting members 24 fixed to the frame member 23 at positions close to the first, second and third piezoelectric elements 25a, 25b and 25c. The shaft supporting members 24 are disposed at the positions beyond moving ranges of the first and second lens holding frames 18 and 19 along the first and second drive shafts 20 and 21. The first and second drive shafts 20 and 21 are preferably formed of a light material with high stiffness, such as carbon, beryllium and the like. Further, a hollow member can also be used to maintain the lightweight and the high stiffness.

Below the first and second lens holding frames 18 and 19, a first photoreflector 28 and a second photoreflector 29 are disposed respectively. The first photoreflector 28 is provided with a light emitting element 28a and a light receiving element 28b. The second photoreflector 29 is provided with a light emitting element 29a and a light receiving element 29b. Below the first and second photoreflectors 28 and 29, a position detection plate 30 with a position detection pattern, which is read by the first and second photoreflectors 28 and 29, is disposed. In the position detection pattern of the position detection plate 30, a white pattern and a black pattern are alternately arranged at regular intervals. Lights emitted from the light emitting elements 28a and 29a are reflected by each of the white pattern and the black pattern. The strong reflected light, which is reflected by the white pattern, and the weak reflected light, which is reflected by the black pattern, are detected in alternate order by the light receiving elements 28a and 29b.

Figure 4:
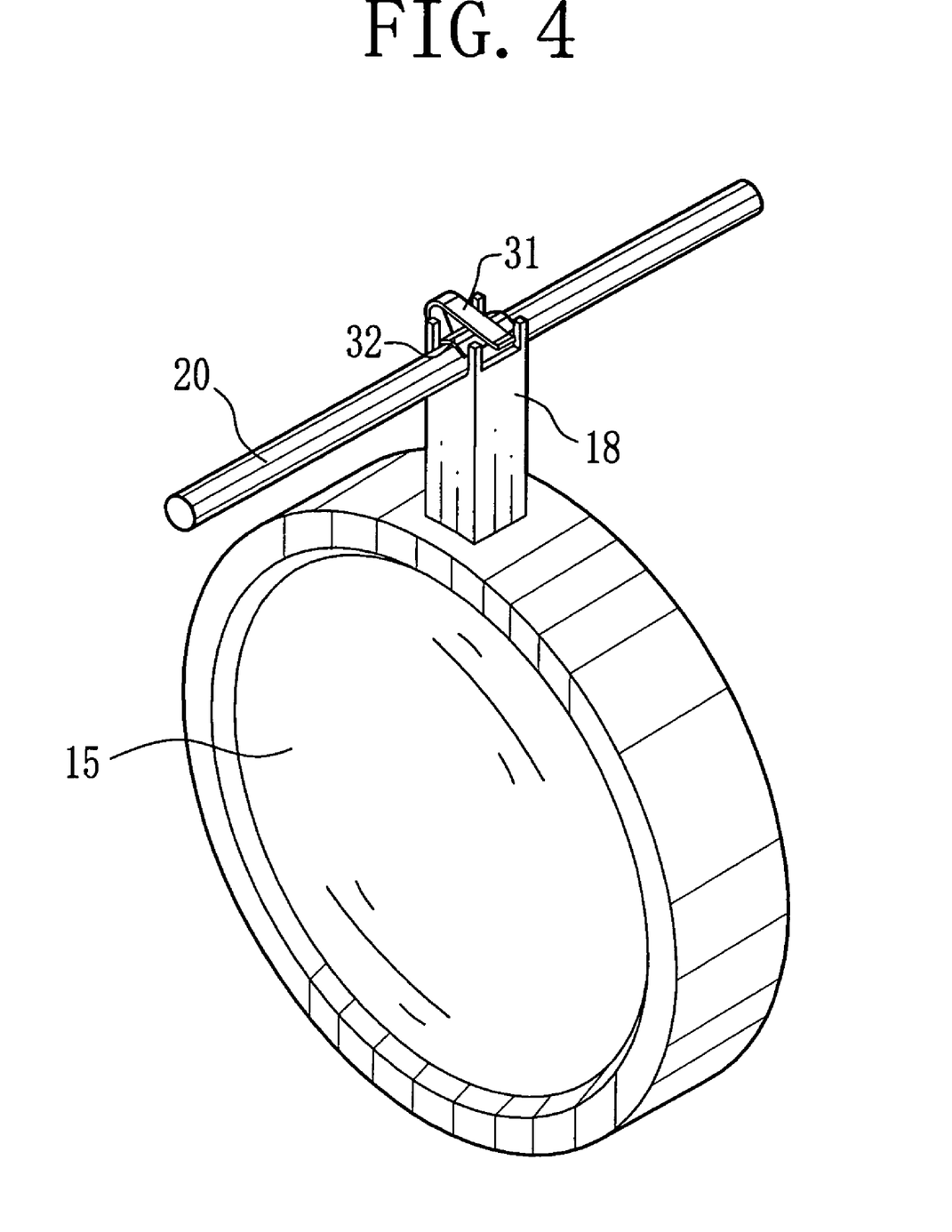
FIG. 4 is a perspective view of a first drive shaft and a first lens holding frame.

In FIG. 4, the first lens holding frame 18 is slidably supported by the first drive shaft 20. The first lens holding frame 18 has a plate spring 31 in an upper section, and a friction plate 32 which is provided between the plate spring 31 and the first drive shaft 20. The plate spring 31 biases the friction plate 32 so that the friction plate 32 is pressed against the first drive shaft 20. Thereby, the first lens holding frame 18 is frictionally engaged with the first drive shaft 20 with an appropriate frictional force. Likewise, the second lens holding frame 19 has the plate spring 31 and the friction plate 32, and the second lens holding frame 19 is frictionally engaged with the second drive shaft 21 with the appropriate frictional force.

Figure 5:
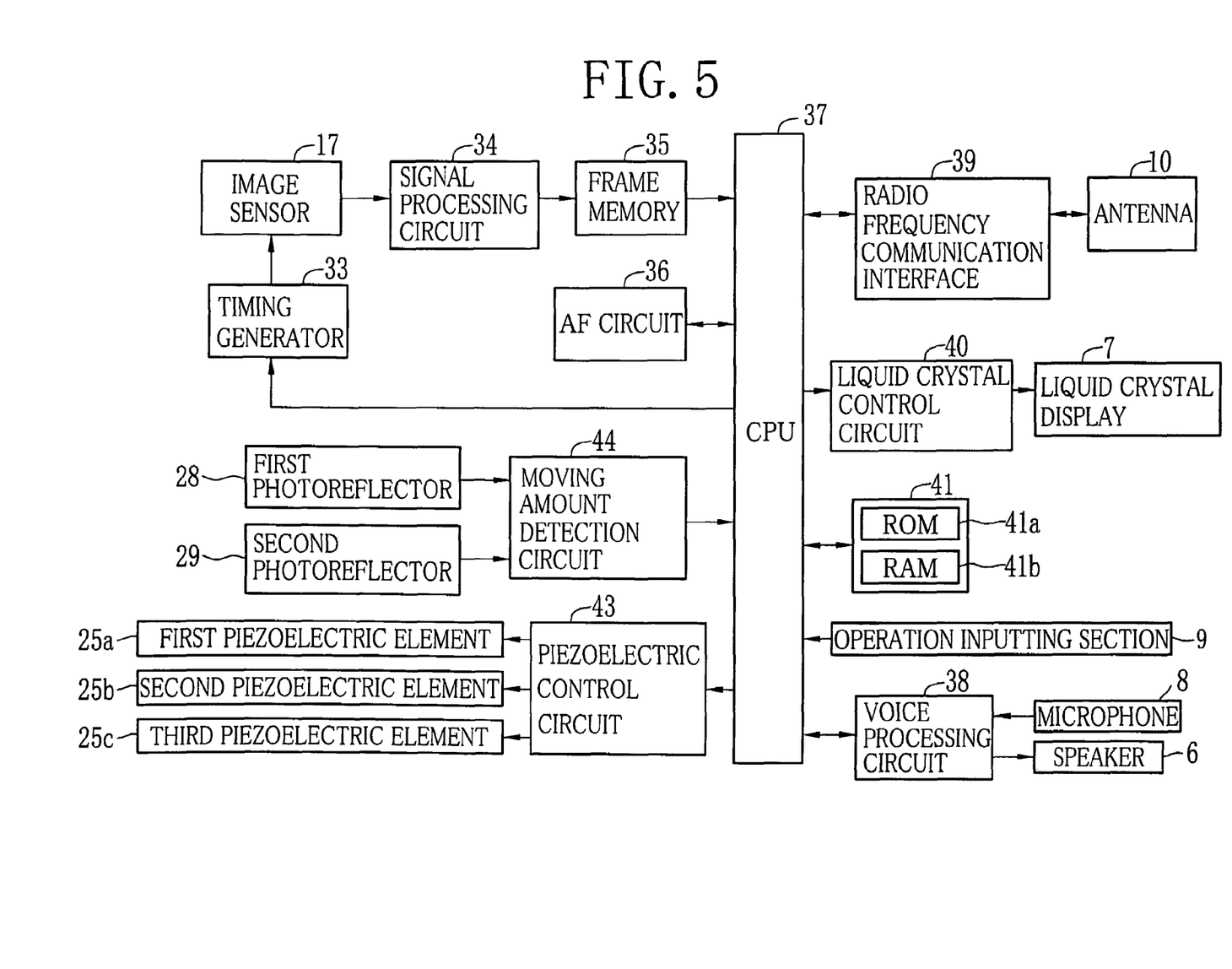
FIG. 5 is a block diagram showing an electrical configuration of the mobile phone with the camera.

In FIG. 5, a timing generator 33 controls the operation, including the setting of the electronic shutter speed, of the image sensor 17. A signal processing circuit 34 performs sampling, amplification and A/D conversion to an image signal output from the image sensor 17 and outputs digital image data. A frame memory 35 temporarily stores the digital image data sequentially output from the signal processing circuit 34.

An AF circuit 36 extracts a luminance component from a predetermined area of the image data stored in the frame memory 35, and obtains a variation in the luminance component between adjacent pixels. The variation in the luminance component is increased as the image contrast is improved. Therefore, the proper focus is achieved when a total sum of the variations in the luminance component reaches a peak value. The AF circuit 36 inputs the total sum of the variations in the luminance component as an AF signal in a CPU 37.

The CPU 37 controls overall operation of the mobile phone 2 with the camera according to the signals input from the operation inputting section 9. For instance, the CPU 37 switches modes of the mobile phone 2 with the camera between a telephone mode and a camera mode.

A voice processing circuit 38 performs various processing, such as noise reduction, to the voices input from the speaker 6 and output to the microphone 8. A radio wave communication interface (I/F) 39 and a base station transmit and receive the radio waves via the antenna 10 during the telephone call. A liquid crystal control circuit 40 controls the display on the LCD 7.

A memory 41 is constituted of a ROM (Read Only Memory) 41a and a RAM (Random Access Memory) 41b. The ROM 41a is a non-volatile memory which stores a program for controlling each section by the CPU 37, and the image data captured by the camera section 13. The RAM 41b is a volatile memory for temporarily storing the operation data which is generated when the CPU 37 executes the control program.

Figure 6:
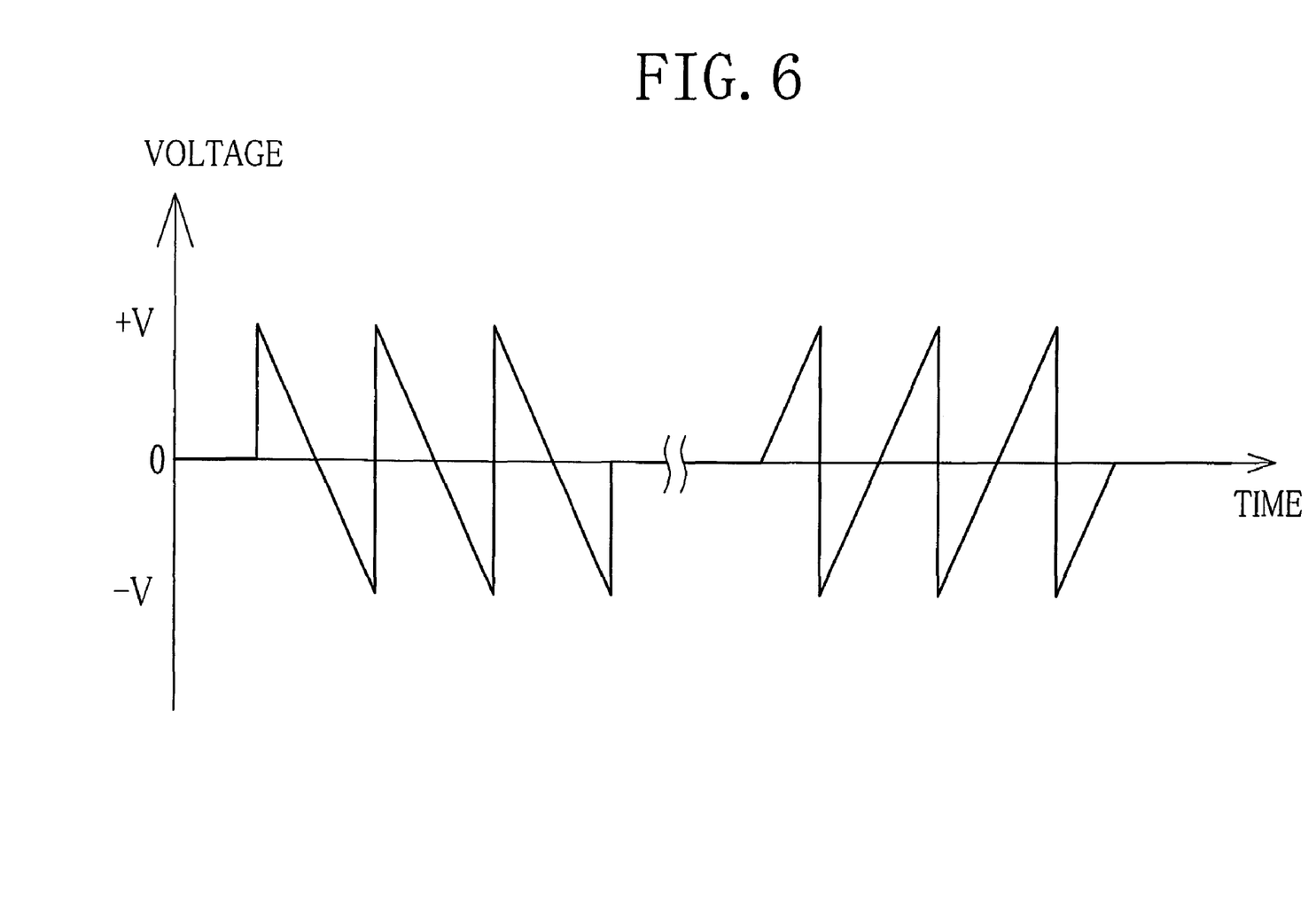
FIG. 6 is a waveform chart of a drive signal.

A piezoelectric control circuit 43 generates a drive signal to be input to each of the first, second and third piezoelectric elements 25a–25c for producing strain-displacements caused by expansion and contraction of the first, second and third piezoelectric elements 25a–25c in an axial direction of the first and the second drive shafts 20 and 21. The first, second and third piezoelectric elements 25a–25c are displaced according to the voltage of the drive signal. As shown in FIG. 6, the drive signal has a waveform which has a period, in which the voltage rises at high speed, and a period in which the voltage rises at low speed in the opposite directions. The piezoelectric element is displaced at the high speed during the period, in which the voltage rises at the high speed, and at the low speed during the period in which the voltage rises at the low speed. When the piezoelectric elements are displaced at the high speed, the first and second drive shafts 20 and 21 are moved at the high speed so that the friction plate 32 of each of the first and the second lens holding frames 18 and 19 slips. Accordingly, the first and second lens holding frames 18 and 19 stay at the same position by the inertia. On the contrary, when the piezoelectric elements are displaced at the low speed, the first and second lens holding frames 18, 19 are moved in accordance with the movements of the first and second drive shafts 20 and 21 due to the frictional force of the friction plate 32. The first and second lens holding frames 18 and 19 move along the first and second drive shafts 20 and 21 respectively by repeating the above operation. Since the first and second drive shafts 20 and 21 are supported by the shaft supporting members 24, the first and second lens holding frames 18 and 19 are moved without deflections.

A moving amount detection circuit 44 detects the changes between the black pattern and the white pattern on the position detection plate 30 according to the signals from the first and second photoreflectors 28 and 29, and calculates a moving distance of each of the first and the second lens holding frames 18 and 19 by counting the number of pattern changes (see FIG. 3). Further, the moving amount detection circuit 44 incorporates a timer circuit and calculates the moving distance per unit time, that is, a moving velocity. Such information is sent to the CPU 37 and thus the positions of the first and second lens holding frames 18 and 19 are identified.

Figure 7:
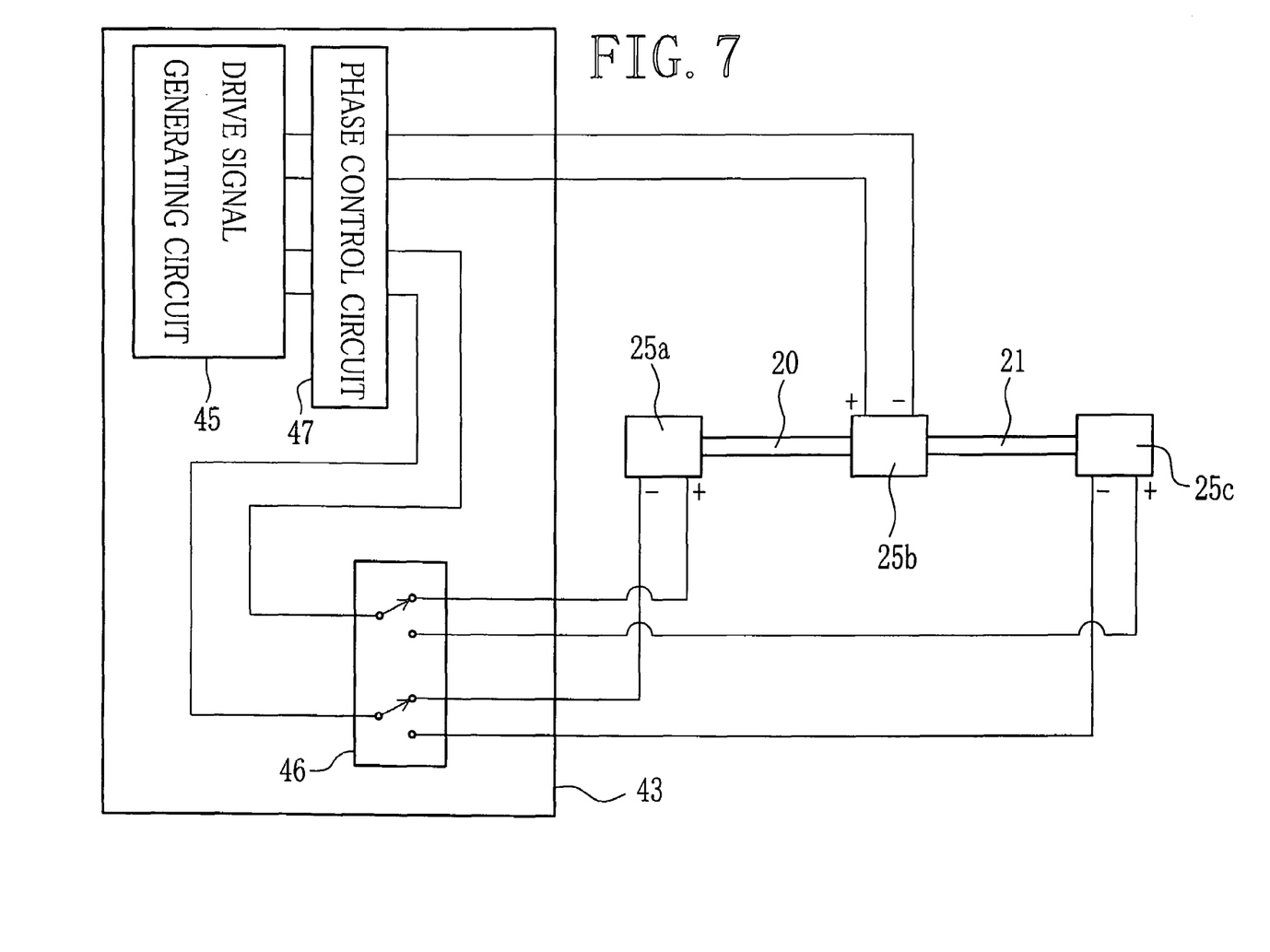
FIG. 7 is a block diagram of a piezoelectric control circuit.

In FIG. 7, the piezoelectric control circuit 43 is provided with a drive signal generating circuit 45, a switching circuit 46 and a phase control circuit 47. The drive signal generating circuit 45 generates the drive signal according to the control signal from the CPU 37 (see FIG. 5), and the voltage of the drive signal is applied to each of the first, second and third piezoelectric element 25a, 25b and 25c. The switching circuit 46 switches between the circuit, in which the drive signal generating circuit 45 is connected the first piezoelectric element 25a, and the circuit, in which the drive signal generating circuit 45 is connected to the third piezoelectric element 25c, according to the control signal from the CPU 37. The drive signal is input to one of the first piezoelectric element 25a and the third piezoelectric element 25c by using the switching circuit 46.

Figure 8A:
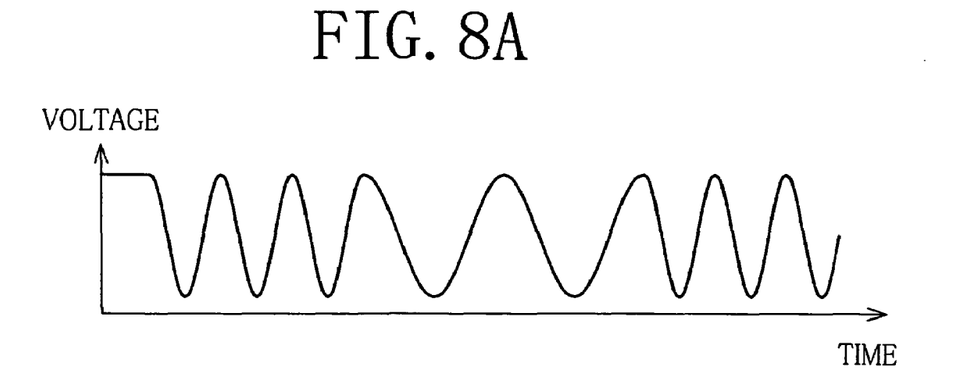
FIG. 8A is an example of changes in a voltage of a signal output from a first photoreflector.
Figure 8B:
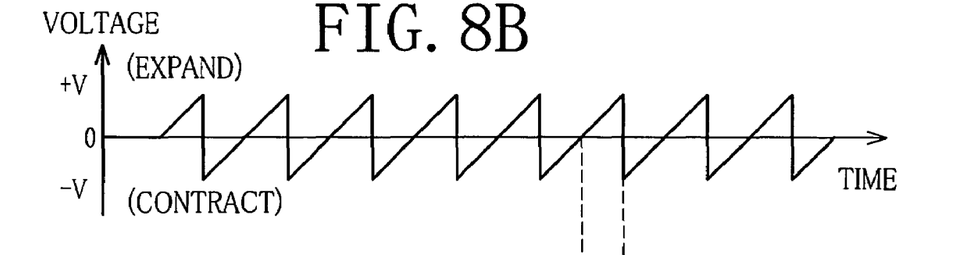
FIG. 8B is an example of the drive signal input to a first piezoelectric element.
Figure 8C:
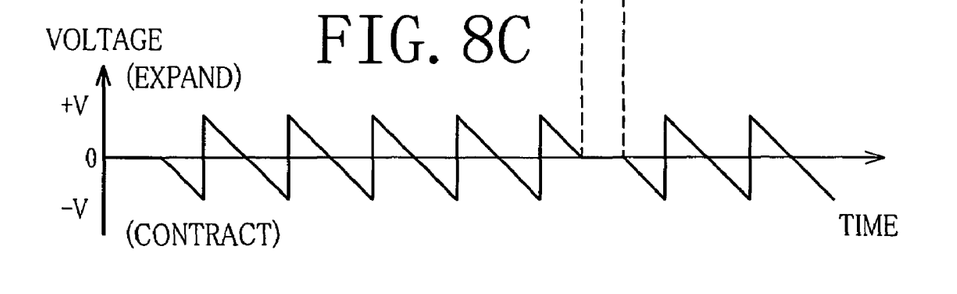
FIG. 8C is an example of shifting the phase of the drive signal input to the second piezoelectric element.
Figure 9A:
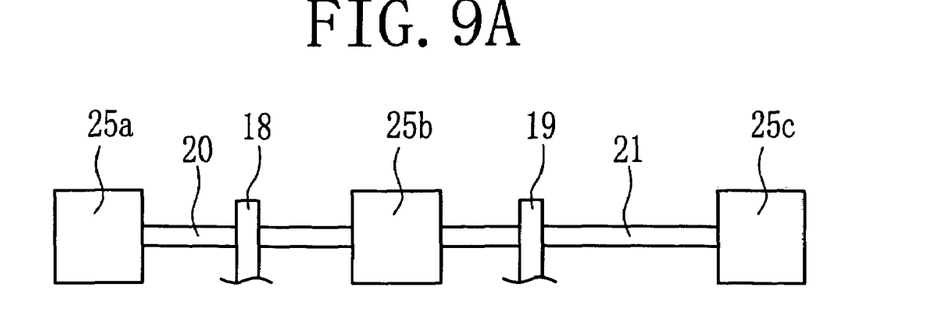
FIGS. 9A, 9B, 9C and 9D are schematic views showing displacements of the piezoelectric elements in a focus adjustment.
Figure 9B:
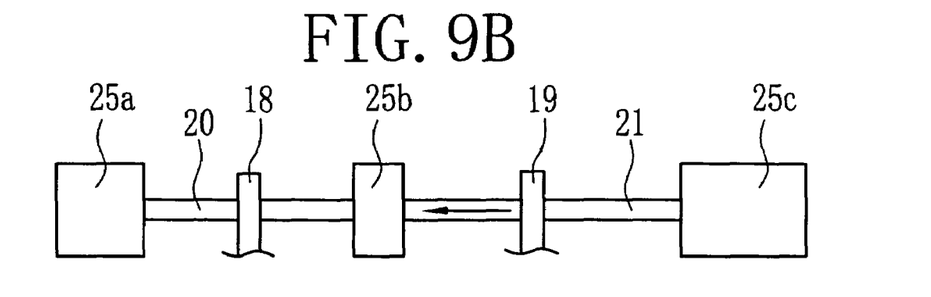
Figure 9C:
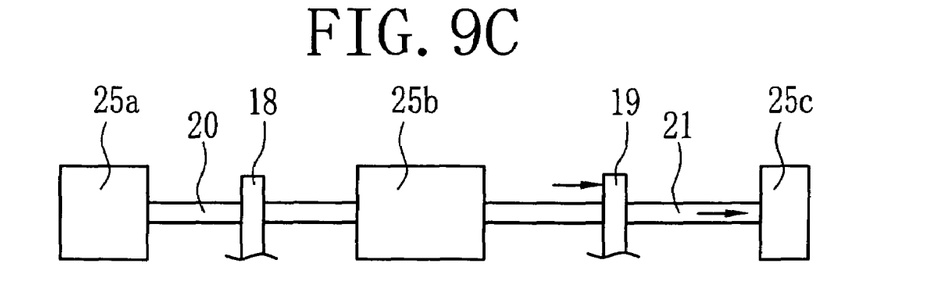
Figure 9D:
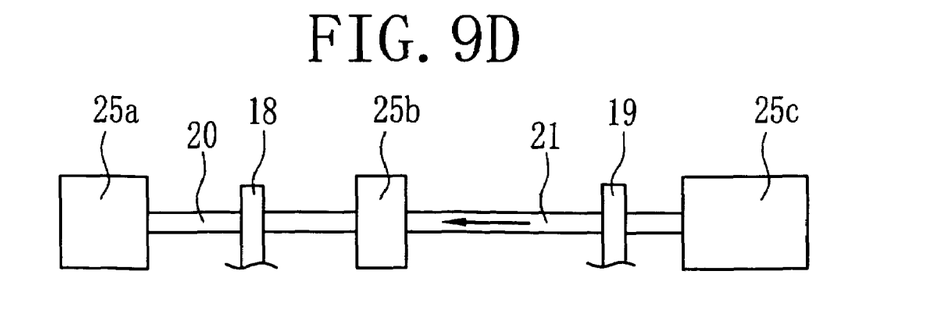
Figure 10A:
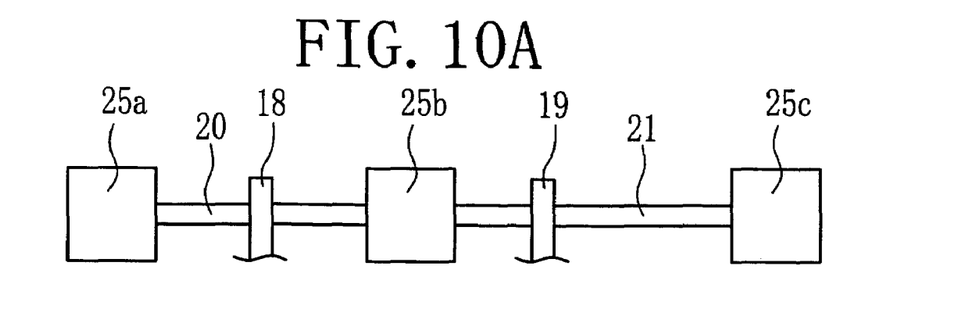
FIGS. 10A, 10B, 10C and 10D are schematic views showing examples of the displacement of each piezoelectric element when all the piezoelectric elements are driven simultaneously.
Figure 10B:
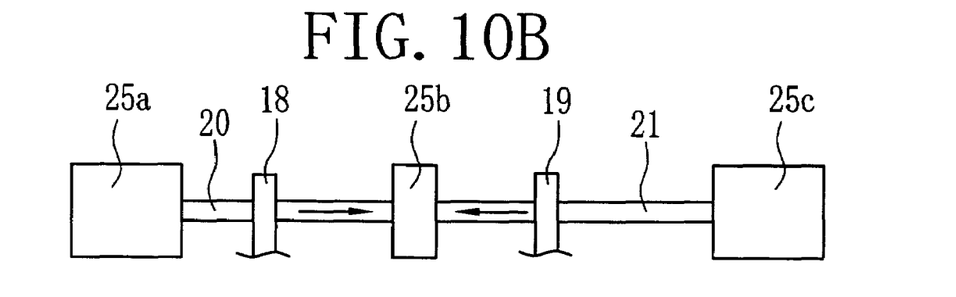
Figure 10C:
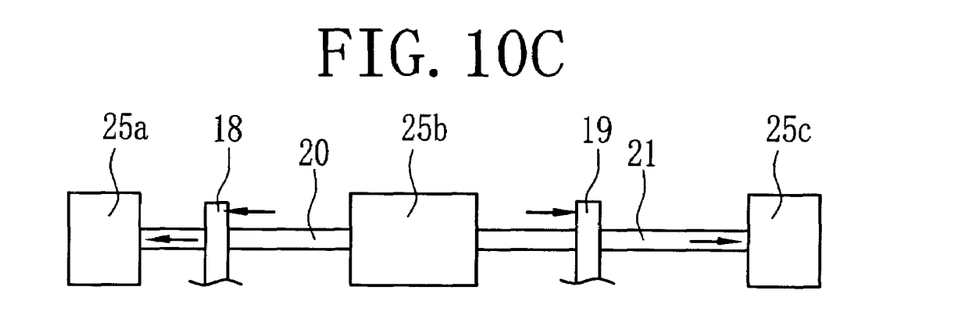
Figure 10D:
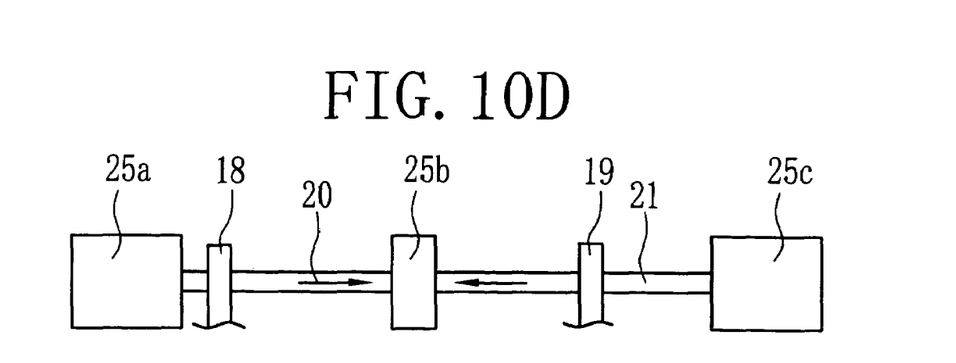

The phase control circuit 47 converts the phase of the drive signal output to each of the piezoelectric elements 25a–25c, and adjusts the timings of the displacements of the piezoelectric elements 25a–25c by shifting the phase of the drive signal. For instance, when the first lens holding frame 18 is moved along the first drive shaft 20 by inputting the drive signal to each of the first piezoelectric element 25a and the second piezoelectric element 25b, a velocity of changes in the voltage of the signal output from the first photoreflector 28 is reduced as the first lens holding frame 18 is positioned close to a center portion of the first drive shaft 20 as shown in FIG. 8A. That is, the moving velocity of the first lens holding frame 18 is reduced. For that reason, the phase of the drive signal input to the second piezoelectric element 25b is shifted (delayed) as shown in FIG. 8C with respect to the drive signal input to the first piezoelectric signal 25a as shown in FIG. 8B. Thereby, the reduction in the moving velocity of the first lens holding frame 18 can be canceled as indicated in FIG. 8A. The same is applied to the movement of the second lens holding frame 19.

Next, the operation of the present invention is described. When the power of the mobile phone 2 with the camera is turned on, the mobile phone 2 is set in the telephone mode by the CPU 37, and used as the telephone by operating the dial keys in the operation inputting section 9. When a mode switching key in the operation inputting section 9 is operated, the CPU 37 switches the mobile phone 2 from the telephone mode to the camera mode. In the camera mode, the image sensor 17 is activated, and the timing generator 33, which has received the control signal from the CPU 37, sends the timing pulse to the image sensor 17 to start the image capturing process.

The light entered into the camera section 13 passes through the first lens 15 and the second lens 16. Then, the light is photoelectrically converted by the image sensor 17. The CPU 37 activates the AF circuit 36 and starts the auto focus processing. The AF circuit 36 calculates the contrast value of the image according to the image data stored in the frame memory 35. Every time the image is captured by the image sensor 17 and the image data is stored in the memory frame 35, the AF circuit 36 reads the image data and calculates the contrast value.

The CPU 37 outputs the control signal to the piezoelectric control circuit 43 to start the focus adjustment. In the piezoelectric control circuit 43, the drive signal is output from the drive signal generating circuit 45. The switching circuit 46 connects the drive signal generating circuit 45 and the third piezoelectric element 25c. Thereby, the voltage of the drive signal is applied to each of the second and third piezoelectric elements 25b and 25c. The drive signals output to the second and third piezoelectric elements 25b and 25c are in the same phase. However, since the voltages are applied in the opposite directions, the second and third piezoelectric elements 25b and 25c are displaced in the opposite directions.

In FIGS. 9A, 9B, 9C and 9D, when a drive signal, whose positive voltage rises at low speed and negative voltage rises at the high speed, is input to the second piezoelectric element 25b, the second piezoelectric element 25b is expanded at the low speed, and contracted at the high speed. Further, when a drive signal, whose positive voltage rises at the high speed and negative voltage rises at the low speed, is input to the third piezoelectric element 25c, the third piezoelectric element 25c is expanded at the high speed, and contracted at the low speed. Accordingly, the second drive shaft 21 is displaced toward the second piezoelectric element 25b at the high speed, and toward the third piezoelectric element 25c at the low speed. As a result, the second lens holding frame 19 stays at the same position by the inertia when the second drive shaft 21 is displaced toward the second piezoelectric element 25b at the high speed, which causes the friction plate 32 to slip (see FIGS. 9B and 9D). On the contrary, when the second drive shaft 21 is displaced toward the third piezoelectric element 25c at the low speed, the second lens holding frame 19 is moved toward the third piezoelectric element 25c due to the frictional force between the friction plate 32 and the second drive shaft 21 (see FIG. 9C).

As the second and third piezoelectric elements 25b and 25c repeat the above operation, the second lens holding frame 19 is moved toward the image sensor 17 so that the distance between the first lens 15, which is held by the first lens holding frame 18, and the second lens 16, which is held by the second lens holding frame 19, are increased (see FIG. 3). The moving amount of the second lens 16 is detected by the moving amount detection circuit 44 (see FIG. 5) and thus the position of the second lens 16 is monitored.

A sharpness of the image captured by the image sensor 17 is changed by moving the second lens 16. The AF circuit 36 calculates the contrast value of the image data sequentially captured by the image sensor 17 and compares the contrast values between the images captured before and after moving the second lens 16. When the contrast value is reduced, the sharpness of the image is also reduced. At that time, the CPU 37 sends the control signal to the piezoelectric control circuit 43 to stop the second lens 16, and then to move the second lens 16 in the opposite direction. On the contrary, when the contrast value is increased, the sharpness of the image is also improved. At that time, the CPU 37 sends the control signal to the piezoelectric control circuit 43 to continuously move the second lens 16 in the same direction.

The AF circuit 36 detects that the image with the best sharpness is obtained when the contrast value passes through a peak value, and sends the detection signal to the CPU 37. The CPU 37 sends the control signal to the piezoelectric control circuit 43 to move the second lens holding frame 19 back in the position where the peak contrast value is obtained. At that time, the drive signal generating circuit 45 reduces the voltage of the drive signal to move the second lens 16 by a small amount to a precise position to obtain the best sharpness. Thus, the focus is adjusted.

Further, by operating the operation inputting section 9, the zooming of the camera section 13 is changed. When the zooming is changed, the CPU 37 sends the control signal to the piezoelectric control circuit 43, and moves the first and second lens holding frames 18 and 19 by the predetermined distance according to the zoom magnification. In the piezoelectric control circuit 43, the drive signal generating circuit 45 is activated and the switching circuit 46 switches the circuit to which the drive signal is output (see FIG. 7).

The drive signal is output to one of pairs of piezoelectric elements, namely, the first and second piezoelectric elements 25a and 25b, or the second and third piezoelectric elements 25b and 25c. When the drive signal is sent to the first and second piezoelectric elements 25a and 25b, the first drive shaft 20 is displaced and the first lens holding frame 18 is moved. When the drive signal is sent to the second and third piezoelectric elements 25b and 25c, the second drive shaft 21 is displaced and the second lens holding frame 19 is moved. The switching circuit 46 switches the circuit, to which the drive signal is output, when each of the first and second lens holding frames 18 and 19 moves a predetermined distance. Thereby, the first and second lens holding frames 18 and 19 are alternately moved.

After the first and second lens holding frames 18 and 19 are moved to the predetermined positions where the proper zoom magnification is obtained, the focus is adjusted in the same manner as above.

After the zoom magnification is changed and the focus is adjusted, the image data is stored in the frame memory 35 by operating a camera operation key provided in the operation inputting section 9. The image capturing is completed when the image data, which is stored in the frame memory 35, is stored in the memory 40.

In the above embodiment, two piezoelectric elements are selectively driven by inputting the drive signal to the first and second piezoelectric elements 25a, 25b or the second and third piezoelectric elements 25b, 25c of the three piezoelectric elements 25a–25c. However, it is also possible to drive all the piezoelectric elements by individually inputting the drive signal to the three piezoelectric elements 25a–25c, for instance. Further, it is also possible to input the drive signal to the first and third piezoelectric elements 25a and 25c to displace the first and second drive shafts 20 and 21 in the same direction, so that the first and second lens holding frames 18 and 19 are moved by the same distance in the same direction.

When all the piezoelectric elements are driven simultaneously, for instance, as shown in FIGS. 10A, 10B, 10C and 10D, the first and second lens holding frames 18 and 19 can be moved in the opposite directions simultaneously by contracting the second piezoelectric element 25b and expanding the first and third piezoelectric elements 25a and 25c at the same time. Deformation of the first and second drive shafts 20 and 21 can be prevented by making the sum of the displacements of the first and second piezoelectric elements 25a and 25c equal to the displacement of the second piezoelectric element 25b so as to keep the whole length of the first and second drive shafts 20 and 21 in the same size. For that reason, a larger voltage is applied the second piezoelectric element 25b compared to the other two piezoelectric elements 25a and 25c.

In the present invention, in order to displace the two piezoelectric elements in the opposite directions, the voltage of the opposite direction is applied to each of the piezoelectric elements when the polarities of the piezoelectric elements are in the same direction. When the polarities of the piezoelectric elements are in the opposite directions, the voltage of the same direction is applied to each of the piezoelectric elements. The same action is performed in both cases.

Figure 11:
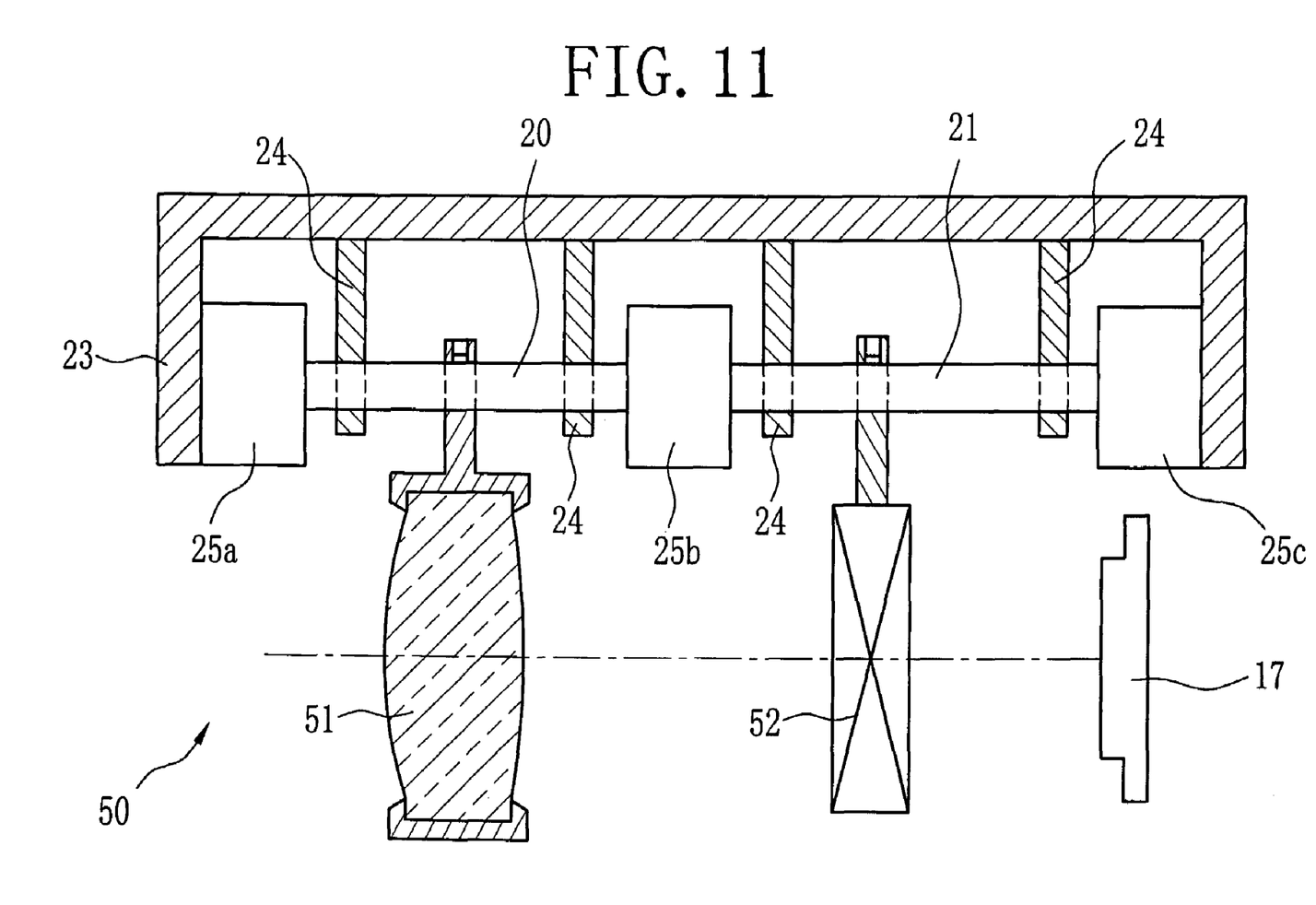
FIG. 11 is a cross-sectional view showing a camera section in another embodiment.

Further, the above embodiment is configured as a lens driving device in which the lenses are held by the first and second drive shafts 20 and 21 respectively. However, as shown in a camera section 50 in FIG. 11, it is also possible that a positive lens 51 is held by the first drive shaft 20, and an aperture 52, which adjusts the brightness of the subject image, is held by the second drive shaft 21. Further, other than using the aperture 52, it is also possible to use an optical filter such as a neutral density filter or a wavelength selection filter, which limits the wavelength of the light passing therethrough, or a light amount control member such as a shutter device.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A driving device comprising:
    a first drive shaft;
    a second drive shaft;
    a first piezoelectric element which is disposed in contact with one end of said first drive shaft;
    a second piezoelectric element which is disposed in contact with the other end of said first drive shaft and one end of said second drive shaft;
    a third piezoelectric element which is disposed in contact with the other end of said second drive shaft;
    a first driven member which is frictionally engaged with said first drive shaft in a slidable manner;
    a second driven member which is frictionally engaged with said second drive shaft in a slidable manner; and
    a drive signal generating circuit, which outputs a drive signal for respectively expanding and contracting said first, second and third piezoelectric elements in an axial direction of said first and second drive shafts, said first and second drive shafts being displaced in said axial direction by said expansion or contraction of said piezoelectric elements so as to move said first and second driven members in said axial direction.

2. A driving device according to claim 1, said driving device further comprising:
    a position detector for detecting each position of said first and second driven members;
    a velocity calculator for calculating each moving velocity of said first and second driven members; and
    a phase control circuit which adjusts said each moving velocity by changing a phase difference between said drive signals for said respective piezoelectric elements according to said calculated moving velocity of each of said first and second driven members.

3. A driving device according to claim 1, said driving device further comprising:
    a switching circuit which selectively switches between a circuit, which supplies said drive signal output from said drive signal generating circuit to said first and second piezoelectric elements, and a circuit, which supplies said drive signal output from said drive signal generating circuit to said second and third piezoelectric elements.

4. A driving device according to claim 3, wherein said drive signal generating circuit outputs said drive signals respectively to said two selected piezoelectric elements such that said two selected piezoelectric elements are displaced in the opposite directions.

5. A driving device according to claim 1, wherein said drive signal generating circuit outputs said drive signals to said first and third piezoelectric elements so as to move said first and second driven members simultaneously in the same direction.

6. A driving device according to claim 1, wherein said drive signal generating circuit simultaneously outputs said drive signals to said first, second and said third piezoelectric elements to drive said first and second driven members simultaneously in the different directions.

7. A driving device according to claim 1, wherein said first and second driven members are first and second lens holding members, each of which holds a lens.

8. A driving device according to claim 7, wherein each of said first and second lens holding members holds a zoom lens.

9. A driving device according to claim 7, wherein one of said first and second lens holding members holds a zoom lens and the other lens holding member holds a focus lens.

10. A driving device according to claim 1, wherein one of said first and second driven members is a lens holding member, which holds a lens, and the other driven member is a light amount control member for controlling an amount of light passing through said lens.

11. A driving device according to claim 1, said driving device further comprising:
plural shaft supporting members for supporting each of said first and second drive shafts.

12. An image capture apparatus comprising an image capture unit having a solid-state imaging device and a lens driving device, said lens driving device including:
a first drive shaft;
a second drive shaft;
a first piezoelectric element which is disposed in contact with one end of said first drive shaft;
a second piezoelectric element which is disposed in contact with the other end of said first drive shaft and one end of said second drive shaft;
a third piezoelectric element which is disposed in contact with the other end of said second drive shaft;
a first optical member holder which is frictionally engaged with said first drive shaft in a slidable manner;
a second optical member holder which is frictionally engaged with said second drive shaft in a slidable manner; and
a drive signal generating circuit, which outputs a drive signal for respectively expanding and contracting said first, second and third piezoelectric elements in an axial direction of said first and second drive shafts, said first and second drive shafts being displaced in said axial direction by said expansion or contraction of said piezoelectric elements so as to move said first and second optical member holders in said axial direction.

13. An image capture apparatus according to claim 12, said lens driving device further comprising:
a position detector for detecting each position of said first and second optical member holders;
a velocity calculator for calculating each moving velocity of said first and second optical member holders; and
a phase control circuit which adjusts said each moving velocity by changing a phase difference between said drive signals for said respective piezoelectric elements according to said calculated moving velocity of each of said first and second optical member holders.

14. An image capture apparatus according to claim 12, wherein each of said first and second optical member holders holds a zoom lens.

15. An image capture apparatus according to claim 12, wherein one of said first and second optical member holders holds a zoom lens and the other optical member holder holds a focus lens.

16. An image capture apparatus according to claim 12, wherein one of said first and second optical member holders holds a lens and the other optical member holders holds a light amount control member for controlling an amount of light passing through said lens.

17. A mobile phone comprising an image capture unit having a solid-state imaging device and a lens driving device, said lens driving device including:
a first drive shaft;
a second drive shaft;
a first piezoelectric element which is disposed in contact with one end of said first drive shaft;
a second piezoelectric element which is disposed in contact with the other end of said first drive shafts and one end of said second drive shaft;
a third piezoelectric element which is disposed in contact with the other end of said second drive shaft;
a first optical member holder which is frictionally engaged with said first drive shaft in a slidable manner;
a second optical member holder which is frictionally engaged with said second drive shaft in a slidable manner; and
a drive signal generating circuit, which outputs a drive signal for respectively expanding and contracting said first, second and third piezoelectric elements in an axial direction of said first and second drive shafts, said first and second drive shafts being displaced in said axial direction by said expansion or contraction of said piezoelectric elements so as to move said first and second optical member holders in said axial direction.

* * * * *